(12) United States Patent
Namuduri et al.

(10) Patent No.: US 10,207,699 B2
(45) Date of Patent: Feb. 19, 2019

(54) HYBRID VEHICLE PROPULSION SYSTEMS AND METHODS

(71) Applicant: GM GLOBAL TECHNOLOGY OPERATIONS LLC, Detroit, MI (US)

(72) Inventors: Chandra S. Namuduri, Troy, MI (US); Venkata Prasad Atluri, Novi, MI (US); Suresh Gopalakrishnan, Troy, MI (US); Jin-Woo Lee, Rochester Hills, MI (US); Kevin J. Robinet, West Bloomfield, MI (US); Sai Rajagopalan, Bloomfield Hills, MI (US); Chen-fang Chang, Bloomfield Hills, MI (US); Michael Livshiz, Ann Arbor, MI (US); Patrick J. O'leary, Clinton Township, MI (US)

( * ) Notice: Subject to any disclaimer, the term of this patent is extended or adjusted under 35 U.S.C. 154(b) by 0 days.

(21) Appl. No.: 15/722,357

(22) Filed: Oct. 2, 2017

(65) Prior Publication Data
US 2018/0105158 A1  Apr. 19, 2018

Related U.S. Application Data

(60) Provisional application No. 62/410,074, filed on Oct. 19, 2016.

(51) Int. Cl.
| | | |
|---|---|---|
| *B60W 20/00* | (2016.01) | |
| *B60W 20/12* | (2016.01) | |
| *B60W 20/15* | (2016.01) | |
| *B60W 40/04* | (2006.01) | |
| *B60W 40/076* | (2012.01) | |

(52) U.S. Cl.
CPC ............ *B60W 20/12* (2016.01); *B60W 20/15* (2016.01); *B60W 40/04* (2013.01); *B60W 40/076* (2013.01); *B60W 2550/20* (2013.01); *B60W 2710/083* (2013.01)

(58) Field of Classification Search
CPC ...... B60W 20/13; B60W 20/10; B60W 20/12; B60W 20/15; B60W 40/04; B60W 40/075; B60K 6/48; B60K 1/00; B60K 6/105; B60K 5/36
See application file for complete search history.

(56) References Cited

U.S. PATENT DOCUMENTS

| | | | | |
|---|---|---|---|---|
| 6,076,036 A | * | 6/2000 | Price | B60K 31/047 180/170 |
| 6,170,587 B1 | * | 1/2001 | Bullock | B60K 6/105 180/165 |
| 2010/0324762 A1 | * | 12/2010 | Imaseki | B60K 6/36 701/22 |

(Continued)

*Primary Examiner* — Hau V Phan

(57) ABSTRACT

A vehicle propulsion system includes a combustion engine configured to output a propulsion torque to satisfy a propulsion demand, and a traction electric machine to generate a supplemental torque to selectively supplement the propulsion torque. The propulsion system also includes a controller programmed to forecast an acceleration demand based on at least one estimation model. The controller is also programmed to issue a command indicative of a required axle torque corresponding to the acceleration demand. The controller is further programmed to engage at least one fuel conservation action in response to the required axle torque being within a first predetermined torque threshold range.

20 Claims, 6 Drawing Sheets

(56) References Cited

U.S. PATENT DOCUMENTS

| | | | |
|---|---|---|---|
| 2012/0197472 A1* | 8/2012 | He | B60K 6/105 |
| | | | 701/22 |
| 2015/0167614 A1* | 6/2015 | Malone | F02N 11/0822 |
| | | | 701/54 |
| 2015/0197242 A1* | 7/2015 | Yamazaki | B60W 20/30 |
| | | | 701/22 |
| 2016/0107633 A1* | 4/2016 | Liang | B60W 20/10 |
| | | | 701/22 |
| 2017/0338706 A1* | 11/2017 | Hao | F02N 11/00 |
| 2018/0050685 A1* | 2/2018 | Atluri | B60K 6/48 |
| 2018/0050686 A1* | 2/2018 | Atluri | B60W 20/13 |

* cited by examiner

HYBRID VEHICLE PROPULSION SYSTEMS AND METHODS

TECHNICAL FIELD

The present disclosure relates to a propulsion system for a hybrid vehicle.

INTRODUCTION

A vehicle may include an internal combustion engine coupled to a transmission and a final drive to transfer torque to road wheels to propel the vehicle. To start the engine of a non-hybrid vehicle, a starter motor can be energized which causes a crankshaft of the engine to turn and begin a combustion cycle. A hybrid electric vehicle may utilize both an electric machine and/or an internal combustion engine to propel the vehicle in order to offer reduced fuel consumption and emissions.

Vehicle connectivity provides data-rich information sources which have been used for user convenience and safety features. Additionally the proliferation of vehicle onboard sensors provides an additional layer of information. Propulsion system operation largely remains constant in spite of the availability of such information. Any adjustments are often reactive in nature and may result in less than fully optimal propulsion system operation.

SUMMARY

A vehicle propulsion system includes a combustion engine configured to output a propulsion torque to satisfy a propulsion demand, and a traction electric machine to generate a supplemental torque to selectively supplement the propulsion torque. The propulsion system also includes a controller programmed to forecast an acceleration demand based on at least one estimation model. The controller is also programmed to issue a command indicative of a required axle torque corresponding to the acceleration demand. The controller is further programmed to engage at least one fuel conservation action in response to the required axle torque being within a first predetermined torque threshold range.

A method of controlling a vehicle propulsion system having a combustion engine configured to output a propulsion torque and a traction electric machine to generate a supplemental torque to selectively supplement the propulsion torque includes forecasting an acceleration demand based on at least one estimation model. The method also includes issuing a command indicative of a required axle torque corresponding to the acceleration demand. The method further includes engaging at least one fuel conservation action in response to the required axle torque being within a first predetermined torque threshold range.

DETAILED DESCRIPTION

Figure 1:
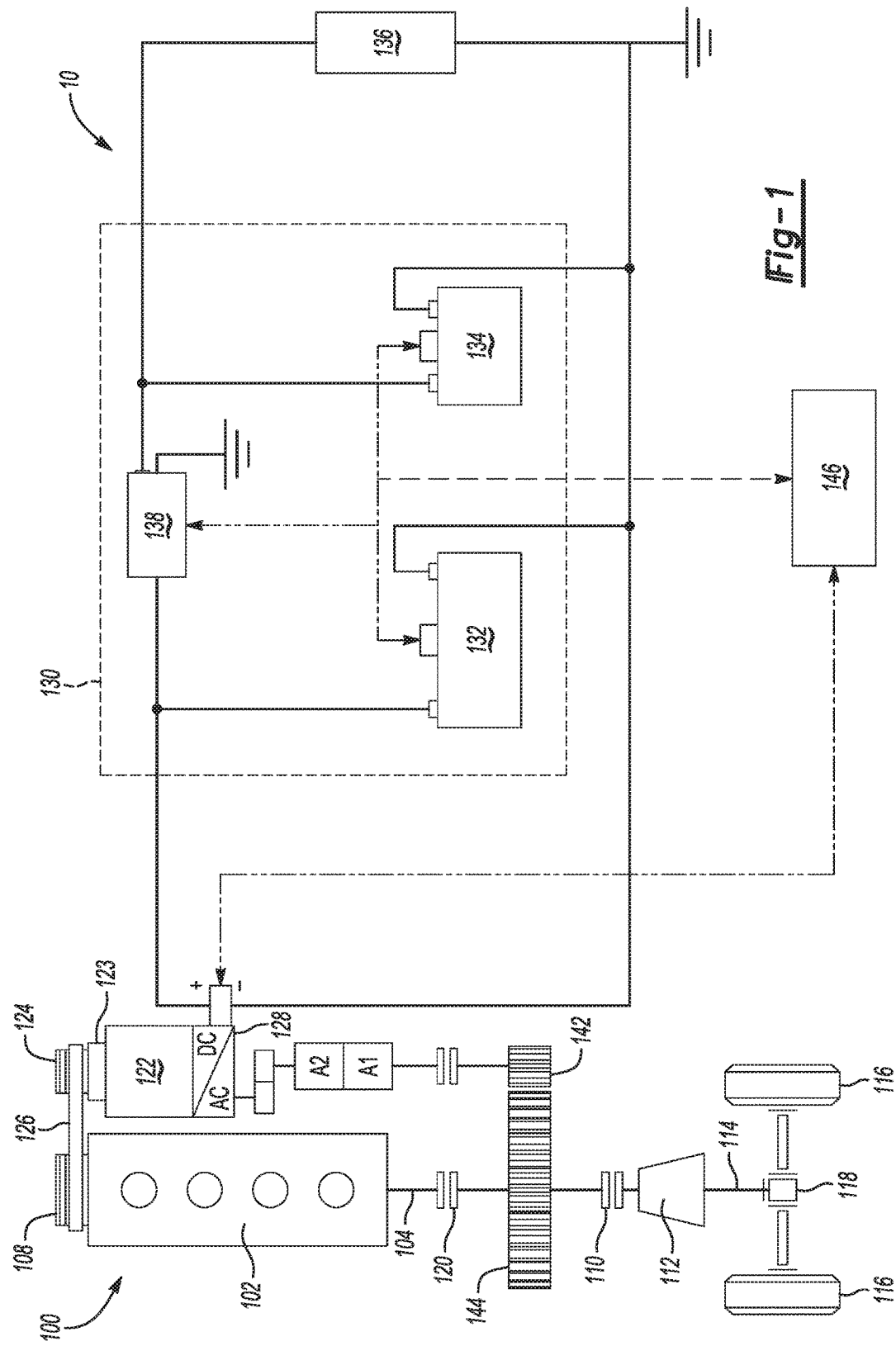
FIG. 1 is a schematic illustration of a hybrid propulsion system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Connected and/or automated vehicles (CAV's) create additional opportunities to further reduce fuel consumption and energy-related emissions. These opportunities may relate to a synergic combination of the advanced in-vehicle propulsion system control technologies which utilize vehicle connectivity and automation technologies. Disclosed herein is are optimal and practical solutions that incorporate connectivity information into vehicle propulsion control systems in order to co-optimize the vehicle dynamics and combustion engine performance. In some examples, a propulsion system controller proactively seeks the opportunities, within the constraints of emissions and driveability, to execute the most fuel-efficient propulsion system operations including, but not limited to, combinations of running at operating "sweet spots" (i.e., efficient engine operating points), aggressive deceleration fuel cutoff, aggressive start-stop, aggressive cylinder deactivation, smart transmission shifting, smart accessory load management, and smart thermal management. The systems and methods discussed herein are adaptable and thus sensitive to the large array of driving scenarios encountered in the real-world and the relative frequency of accelerating and decelerating scenarios.

The preview nature of some the information available at the vehicle (e.g., the status of a traffic signal before vehicles reach an intersection; traffic, weather, and accident information) enables the design of the propulsion system controller to plan ahead in order to (i) optimize total vehicle energy usage, (ii) cascade anticipated speed and torque requests to lower-level controllers and actuators, and (iii) execute the most efficient propulsion system operations.

A CAV may include different levels of autonomy, ranging from fully manual driving modes to fully autonomous modes with little driver interaction. In full manual examples, the control strategies may heavily interact with driver inputs and expectations of vehicle responses. Therefore one aspect of the present disclosure is utilizing opportunities to preempt certain driver inputs in such a way that is transparent to the driver, yet yields the benefit of optimizing one or more operating parameters of the propulsion system.

Referring to FIG. 1, vehicle 10 includes propulsion system 100 having multiple propulsion sources to provide motive power. In various examples, the propulsion system includes internal combustion engine 102 to generate torque at shaft 104 which may be coupled to a crankshaft of the engine. The engine 102 may be a multi-cylinder internal combustion engine that converts fuel to a mechanical torque through a thermodynamic process. Shaft 104 is coupled to an input of a transmission 112 which is configured to provide multiple gear ratios to modify torque and rotational speed to affect drive characteristics. The output of the transmission 112 is then delivered to a final drive output shaft 114 to deliver torque to one or more road wheels 116. The propulsion system may also include a final drive mechanism 118 configured to allocate torque to multiple road wheels 116 from a single torque input. In one example the final drive mechanism 118 is a differential configured to distribute torque to one or more side shafts which are coupled to road wheels 116. The propulsion system may be arranged to deliver torque through any of a front-wheel drive, a rear-wheel drive, or an all-wheel drive configuration.

The engine 102 may be selectively coupled and decoupled from the propulsion system. One or more selectable disconnect elements may be located at various positions along the torque flow path. For example, a first clutch 110 may be provided to selectively engage or disengage the torque output of the engine 102 based on the desired operating mode of the propulsion system 100. In an alternative example, a clutch may be included as a lockup portion of the fluid coupling torque converter. Additionally, any of the clutches described herein may include selectable state one-way clutch portions configured to passively engage, for example during overrun conditions, and actively engage to transfer torque in a single direction. Other types of torque transfer mechanisms may be suitable to connect and/or disconnect the engine from the driveline. Discussed in more detail below, the disengaged state of the engine 102 facilitates inactive engine operation modes to enhance fuel efficiency. As used herein, an inactive state of the engine refers to a condition where the engine has substantially zero output torque and zero speed. In contrast, an active state refers to a condition where the engine is rotating.

The propulsion system 100 also includes a second propulsion source such as a traction electric machine 122. In the example of FIG. 1, the traction electric machine is selectively coupled to both of input portions and output portions of the engine 102.

The traction electric machine 122 may operate as a starter motor (or a separate starter motor may be used) to provide torque to an input portion of the engine 102. The traction electric machine 122 may be selectively coupled to a motor torque interface 124 via a disconnect clutch 123. In some examples the disconnect clutch 123 is integrated as part of an electric machine module and is configured to be in a normally closed state. The motor torque interface 124 is in turn coupled to a driveline torque interface 108 via a torque coupling 126. The torque coupling 126 may include a belt to transfer torque between the traction electric machine 122 and other portions of the driveline. In this case, motor torque interface 124 and driveline torque interface 108 may each be provided as pulleys arranged to cooperate with the torque coupling 126. A belt may be a ribbed belt, a flat belt, or other configuration suitable to transfer torque. In some examples, the torque coupling 126 may be provided as a chain instead of a belt, and sprockets can be utilized with the chain as opposed to pulleys. In further examples, the driveline torque interface 108, motor torque interface 124, and the torque coupling 126 may include a plurality of gears to transfer torque from the traction electric machine 122 to crank the engine 102. The electric machine 122 may receive a control signal ramp up output speed and engage the clutch 123 once the starter electric machine is at a suitable speed for smooth torque transfer to start the engine 102.

A controller 146 may be programmed to issue commands to start the engine in response to an acceleration demand following a period of reduced acceleration demand. When the engine is restarted, it may be restarted from a substantially zero rotational speed, or from a speed which is significantly less than the rotational speed of the downstream powertrain components such as the traction electric machine 122. The controller 146 may implement a delay following the initial restart of the engine 102 to allow engine speed to ramp up to be within a predetermined range of the system speed prior to engaging a disconnect clutch. Reducing the difference between engine speed and speed of the downstream components improves the smoothness of clutch engagement and reduces noise, vibration, and harshness (NVH) perceived by a passenger related to the engine restart event.

The traction electric machine 122 may be selectively engaged to supplement or replace engine output through a geared mechanical connection to pass torque to the output shaft to propel the vehicle. In one example, a pinion gear 142 cooperates with a ring gear 144 to turn the output shaft 114. The ring gear 144 may be in turn coupled to the output shaft 104 of the engine 102. In another example, the traction electric machine 122 may be connected to the ring gear through a toothed belt mechanical connection to pass torque to the output shaft of the engine 102.

In further examples, the traction electric machine is integrated as part of a rear differential of a rear wheel drive configuration. In alternative configurations, the electric machine may be located downstream relative to the flow of torque and integrated into a housing of the transmission 112.

The traction electric machine 122 exchanges power with a first energy storage device (ESS) 132 (e.g., such as a high-voltage battery) over a high-voltage bus. In some examples, other energy storage types may be viable to provide power to the propulsion system. More specifically, storage devices such as lead acid/li-ion batteries, super capacitors, or other storage devices may be suitable according to aspects of the present disclosure. The traction electric machine 122 has multiple operating modes depending on the direction of power flow. For example, the traction electric machine 122 may operate as a traction motor to output torque, operate as a generator to recover energy from rotational motion in the driveline, and also operate in a power-neutral freewheeling state. Additionally, the traction electric machine 122 is configured as an "off-axis" motor-generator, meaning its axis of rotation is separate from the axis of rotation of the engine 102 and other rotating components of the propulsion system. A wider range of torque ratios may be available, and a smaller electric machine may be sufficient to satisfy propulsion demands. Additionally, the traction electric machine may be capable of high speeds of at least two to three times the engine output speed. In other examples, the traction electric machine 122 may be arranged to be "on-axis" such that the axis of rotation of the electric machine is common to the axis of rotation of the engine.

In traction motor mode, a power conversion portion 128 operates as an inverter to convert direct current (DC) power received from one or more energy storage systems into three-phase alternating current (AC) power to operate the electric machine. In one example, DC power is delivered from the first ESS 132 allowing the traction electric machine 122 to output torque to motor torque interface 124. The power conversion portion also includes a pulse width modulation (PWM) control of one or more internal switches to convert the DC power into AC power in order to generate an electromagnetic field to drive the electric machine. As discussed above, the traction electric machine may be coupled or connected at various locations along the driveline relative to the torque flow of the propulsion system.

A first clutch 110 may be arranged to decouple both of the engine 102 and the traction electric machine 122 from the driveline. The engine 102 may still be coupled to the traction electric machine 122 to generate power even during periods when the propulsion sources are not propelling the vehicle.

A second clutch 120 may be arranged to decouple the engine 102 from the driveline. The electric machine may remain coupled to the driveline in order to supply propulsion torque or provide regenerative braking.

In generator mode, the direction of torque flow through ring gear 144 is reversed and rotational motion in the driveline is used to drive the pinion gear 142 and thus generate three phase alternating current. The power conversion portion 128 functions as a power rectifier to convert AC current generated by the traction electric machine 122 into DC current to be received at the first ESS 132. The generated current may be used to recharge the first ESS 132 (e.g., a high-voltage battery) and/or supply other vehicle electrical loads.

The first ESS 132 also includes a plurality of sensors to output signals indicative of operating conditions, including but not limited to storage device temperature, current transfer at the ESS, and ESS voltage. Generally, a high-voltage power source is one that has an operating voltage greater than 30 volts but less than 60 volts. In one example, the first ESS 132 is a lithium ion high-voltage battery with a nominal voltage of about 48 volts. In alternative examples, a 36 volt power source may be provided as the high-voltage power source.

A second ESS 134 (e.g., a low voltage battery) is arranged to supply power to vehicle loads 136 over a low-voltage bus. Loads 136 may include vehicle accessories and other loads with relatively low electrical demand. For example, the low-voltage battery may have a nominal voltage of about 12 volts and generally less than about 18 volts.

A unidirectional or bidirectional DC-DC converter 138 may be provided to exchange power between high and low voltage electrical buses. The DC-DC converter 138 may be part of an accessory power control module (APM) and include an internal unidirectional blocking switch or a bidirectional blocking switch. In one configuration, the DC-DC converter 138 includes at least one solid-state switch. The DC-DC converter 138 is configured to allow continuous or selective electrical communication between the high-voltage bus and the low-voltage bus. Therefore, the DC-DC converter 138 can be utilized to ensure that the desired amount of current, within a predetermined voltage range, is delivered to low-voltage loads 136 to power various accessories which can include powering all or some of the accessories of the vehicle 10. The DC-DC converter 138 can be utilized to provide substantially constant voltage to the low-voltage loads 136 if a voltage level of either power source differs from a desired nominal value. In one example, if the voltage level deviates to less than about 10 volts or more than about 16 volts relative to a 12 volt nominal value, the DC-DC converter 138 can regulate the voltage being delivered to the low-voltage load 136. Therefore, the DC-DC converter can increase or decrease the voltage being delivered to power vehicle accessories. In another example the DC-DC converter is arranged to convert voltage from about 48 volts to about 12 volts, and vice versa. While the aforementioned voltage values are provided by way of example, it should be appreciated that the present disclosure may be related to power transitions between a range of voltage values for each of a high-voltage bus and a low-voltage bus.

The DC-DC converter 138 may be used in either direction of power exchange such that the first ESS 132 may supply the low-voltage loads 136 without drawing power from the second ESS 134. Additionally, the DC-DC converter 138 may be used to jump start a first ESS 132 such as a high-voltage battery using power from the low-voltage second ESS 134.

In at least one example, each of the power sources, including the first ESS 132 and second ESS 134, is integrated into a single power module 130. Additionally, the DC-DC converter 138 may similarly be integrated into the power module 130. In some alternate examples, each of the power sources may have substantially the same voltage. In further alternate examples, power may be provided by a single high-voltage power source. In such examples, the single ESS may be jump started from an external power source. The DC-DC converter may be used to step down the voltage to supply low voltage vehicle loads. Further still, certain alternate examples may include a third power source, for example a redundant low-voltage power source.

Either of the first and second ESS's 132, 134 or multiple of either may form a dual battery system configured to provide necessary electric power to safety critical loads in case of engine off and/or when a primary battery has a fault condition. For example, the electrical power may be supplied to the loads 136 to maintain safety critical minimums. A control system, such as the DC-DC converter 138, another DC-DC converter used as an isolator, or another controller, is configured to select one of the first and second batteries or ESS's to provide the electric power for the safety critical loads in the engine-off condition and/or the fault condition. For example, if the ESS 134 defaults, the ESS 132 can be used to provide electrical power to the load 136 to maintain safety critical loads, or vice versa.

As discussed above, the propulsion system 100 may include one or more associated controllers to control and monitor operation. With continued reference to FIG. 1, the vehicle propulsion system 100 includes a controller 146 to manage propulsion of vehicle 10. Controller 146, although schematically depicted as a single controller, may be implemented as one controller, or as system of controllers in cooperation to collectively manage the propulsion system. Communication between multiple controllers, and communication between controllers, actuators and/or sensors may be accomplished using a direct wired link, a networked communications bus link, a wireless link, a serial peripheral interface bus or any another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. In a specific example, multiple controllers communicate with one another via a serial bus (e.g., Controller Area Network (CAN)) or via discrete conductors. The controller 146 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 146 may also store a number of algorithms or computer executable instructions to issue commands to perform actions according to the present disclosure.

Figure 2:
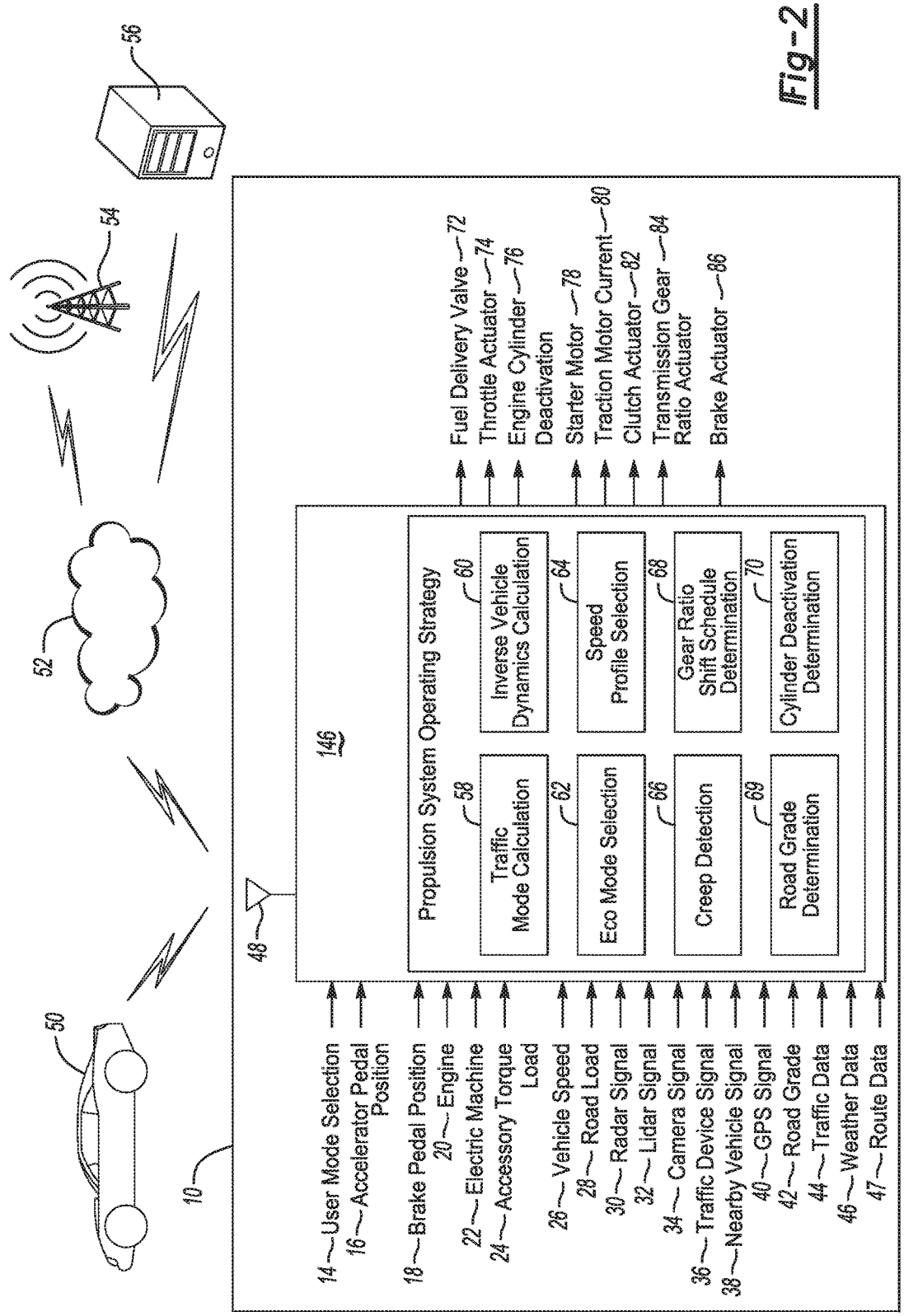
FIG. 2 is a system diagram of a propulsion system controller.

Referring to FIG. 2, the controller 146 is programmed to monitor and coordinate operation of the various propulsion system components. The controller 146 is in communication with the engine and receives signals 20 indicative of engine rotational speed (RPM), temperature, pressure, and exhaust composition, and/or additional engine parameters. The controller may also receive other signals pertaining to the state of the engine and its operating conditions. The controller 146 is also in communication with the electric machine and receives signals 22 indicative of motor speed, torque, temperature, current draw, and voltage across the motor. The controller 146 also receives signals 14 indicative of a user selection of any of various propulsion system operation modes. The controller 146 is communication with one or more sensors at driver input pedals to receive signals indicative of pedal position which may reflect both positive and negative acceleration demand provided by the driver. The driver input pedals sensors may output accelerator pedal signal 16 and a brake pedal signal 18. In certain alternative examples, such as a self-driving autonomous vehicle, acceleration demand may be determined by a computer that is either on-board or off-board of the vehicle 10 without driver interaction. The controller also receives signals 24 indicative of accessory loads which may be driven by propulsion system output, vehicle speed signal 26, and road load signal 28 indicating torque output at the vehicle wheels.

The controller 146 also receives a number of signals from onboard sensors, such as radar signals 30, lidar signals 32, and camera signals 34. As discussed in more detail below, the onboard sensors may be used to sense the environment around the vehicle 10 in order to inform decisions regarding propulsion system operation.

The controller 146 may also receive data signals from external sources. Signal 36 from infrastructure traffic devices indicates current and upcoming states of such devices. Signal 38 from nearby vehicles 50 may include information such location, speed, and route information of other vehicles. A global positioning system (GPS) signal 40 provides the location of the host vehicle 10. The controller 146 may further be in communication with a cellular network 54 or satellite to obtain a GPS location. Road grade signal 42, traffic data signal 44, and weather data signal 46 each may be received at the vehicle 10 and include information about the upcoming route of the host vehicle. Route data 47 is also provided via a user or machine selection of a destination location. A navigation processor is programmed to determine the route data 47 based on a difference between a vehicles' current location and the destination location.

Based on the various input signals received by the controller, a processor is programmed to generate possible driving behaviors and execute one or more algorithms to control operation of the propulsion system. An operating system is stored at the controller 146 to monitor and regulate operation of the components of the propulsion system. The operating system may include a traffic mode calculation algorithm 58 to determine external traffic conditions and implement optimal engine operation based on the forecasted conditions. Algorithm 60 uses vehicle dynamics to calculate required torque at the vehicle wheels, or road load, based on the external conditions. Algorithm 62 may be employed to automatically determine when the host vehicle 10 is stopped at an intersection. Algorithm 64 may be used to select a predetermined speed profile based on the forecasted driving events. Algorithm 66 automatically detects high traffic congestion creep conditions and adjusts engine operation to optimize for the low-speed stop and go driving. Algorithm 68 includes a number of different shift schedules for the transmission gear ratio, and shifting may be adjusted based on the forecast driving conditions. In some examples, algorithm 69 includes a road grade estimation calculation where direct road grade data is not received from external sources. Algorithm 70 includes logic to selectively deactivate a number of the combustion cylinders of the engine when sufficiently low torque output is required such that a portion of the overall number of cylinders is sufficient to satisfy torque demand. Algorithms 58, 60, 62, 64, 66, 68, 69, and 70 are each described above as independent features. However, it should be appreciated that certain aspects of the features include functional overlap and therefore may be components which are combined into one or more comprehensive overarching algorithms.

With continued reference to FIG. 2, the controller 146 provides several output signals to influence the operation of the propulsion system and other component which influence vehicle dynamics. The controller 146 may control engine operation by control signal 72 which regulates fuel volume flow to the engine, control signal 74 to control airflow though the throttle, a control signal 76 to control engine cylinder deactivation, as well as control signal 78 which triggers engine start and restart. The controller also outputs control signal 80 to regulate the amount of current provided to the traction electric machine. One or more clutch control signals 82 are output to open or close combinations of the various disconnect clutches to regulate torque flow. The controller also provides signals to influence transmission operation such as and a gear ratio shifting actuator control signal 84. The controller also may regulate friction brakes with control signal 86 to manage vehicle deceleration.

An optimized propulsion system control strategy may be used in connected vehicles having a combustion engine to apply any of multiple driving profiles. Depending on the desired objective, any of several different fuel consumption modes may be implemented to affect operation of the propulsion system. For example, an "eco" mode may be configured to minimize fuel consumption. The eco mode is discussed by way of example in the present disclosure, however different fuel consumption modes may be selectively employed to achieve any of a number of objectives. A performance mode may be configured to maximize propulsion system output and/or driving dynamics. According to additional examples, modes may be configured to optimize traffic flow and minimize stops across a population of vehicles near the host vehicle 10. Optimized control for vehicle propulsion systems according to the present disclosure supports various fuel economy optimization strategies to maximize fuel economy during frequently used real-world vehicle maneuvers.

Sub-strategies such as an eco-cruise may be employed under certain driving scenarios or maneuvers. Such strategies are effective to more fully utilize available data to achieve better real-world fuel efficiency. Several different control features can be further coordinated to improve fuel economy. For example, any combination of deceleration fuel cutoff (DFCO) (which could be to the engine or to the driveline during coasting), engine stop-start, modified transmission shift schedules, limitation of acceleration torque request, and cylinder deactivation can be applied to further the objective of fuel consumption optimization preempting a driver torque request. According to certain examples, a speed profile may be selected to fine tune fuel consumption: during deceleration while approaching a known stop, during departing from a stop where upcoming traffic conditions are known, and/or during various other traffic flow conditions.

Figure 3:
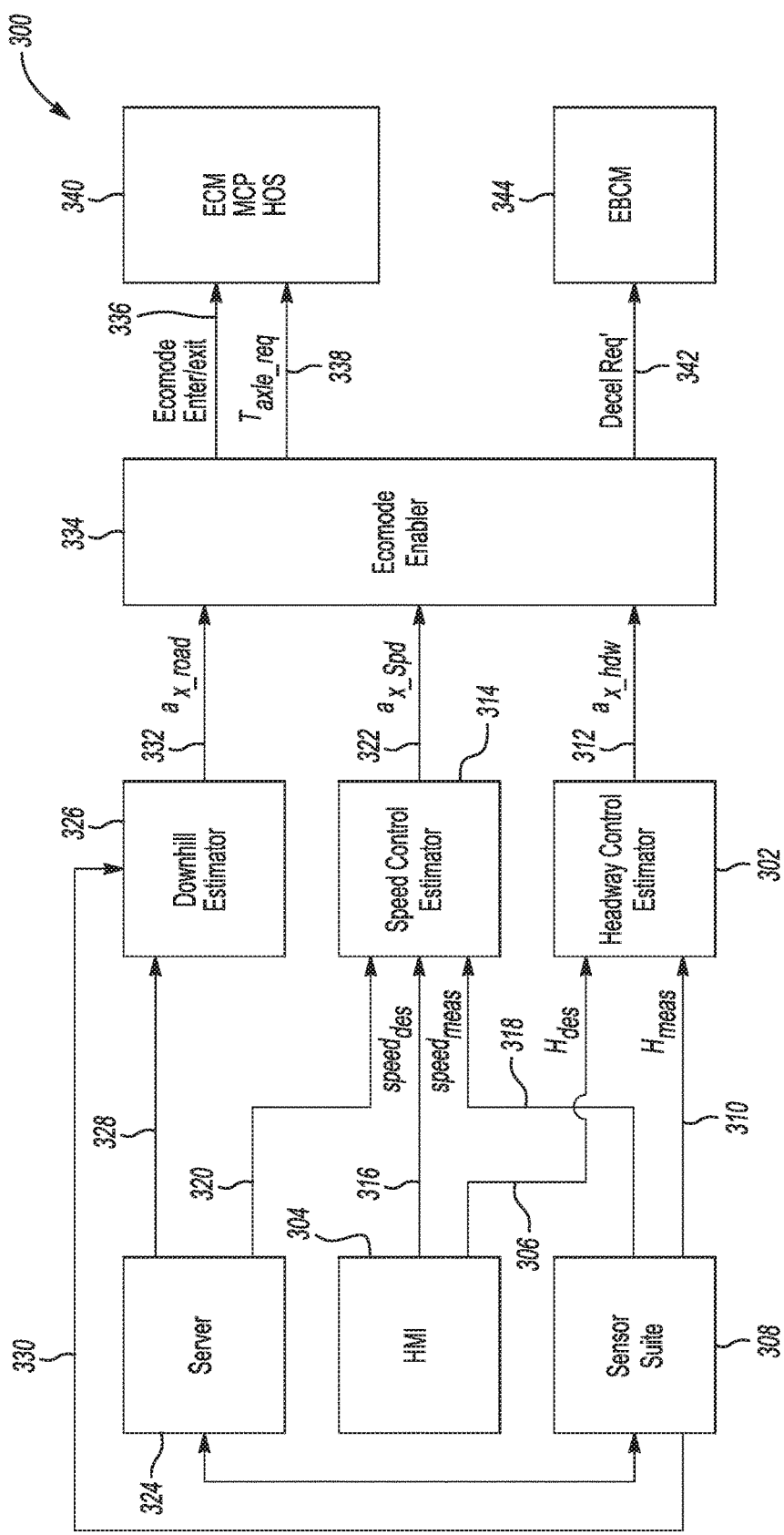
FIG. 3 is a block diagram of a propulsion system control algorithm.

Referring to FIG. 3, data indicative of upcoming travel conditions is used to enhance propulsion system operation. The controller is programmed to execute algorithm 300 to determine optimal longitudinal motion control by combining a number of independent control strategies. According to some examples, three separate control schemes are applied to maximize cruising opportunities based on route preview information to improve fuel economy. A first control scheme may include a headway control estimator model 302 to control longitudinal movement to regulate headway, or the desired spacing between the host vehicle and a proximate vehicle. Headway may be defined by a relative distance between vehicles, or alternatively in terms of a duration of time between subsequent vehicles passing by a given fixed point. Inputs from a human machine interface (HMI) 304 may include signals 306 indicative of a driver desired amount of headway, $H_{des}$. For example, a braking input may indicate a driver desire to increase headway, while an accelerator pedal input may indicate a driver desire to decrease headway. The headway control estimator 302 may also rely on input from a vehicle sensor suite 308, such as a signal 310 indicative of a measured headway distance, $H_{meas}$. The signal 310 from the sensor suite 308 may also include a host vehicle speed and the proximate vehicle speed. The headway control estimator 302 may output a signal 312 indicative of a desired acceleration $a_{x\_hdw}$ (which may range across both positive and negative values) based on an upcoming desired headway.

In some examples, a PID control is used to maintain a driver's set headway distance to the target vehicle, $H_{des}$. The relative speed and distance to the target vehicle may be used as inputs to the PID controller. The desired acceleration $a_{x\_hdw}$ output by the headway controller may be determined using equation (1) below.

$$a_{x\_hdw}=K_p(H_{des}-H_{meas})+K_d(V_{x_{target}}-V_{x\_meas}) \quad (1)$$

In equation (1) above, $K_p$ and $K_d$ are control tuning parameters, and $H_{meas}$ is a headway measurement, for example as obtained from a radar sensor. $V_{x_{meas}}$ is a speed sensor measurement of the host vehicle, and $V_{x_{target}}$ is a speed measurement of a proximate target vehicle for example as obtained from a radar sensor. In some cases, $a_{x\_hdw}$ is the acceleration required to maintain the cruise headway distance.

A second control scheme may include a speed control estimator model 314 to control longitudinal movement to regulate vehicle upcoming speed. Inputs from the HMI 304 may include a signal 316 indicative of a driver desired speed, $speed_{des}$, for example as determined from an accelerator pedal input. The speed control estimator 314 may also rely on input from one or more signals 318 from the vehicle sensor suite 308, such as a signal indicative of a measured current vehicle speed, $speed_{meas}$. In some examples the signals 318 also include data provided by additional onboard sensors in order to predict upcoming vehicle speed. More specifically, consolidation of data from nearby devices using vehicle-to-infrastructure (V2I) communications, data from other vehicles using vehicle-to-vehicle (V2V) communications, as well as data from external servers using wireless communications (e.g., traffic flow data) is consolidated to forecast the host vehicle upcoming speed. The speed control estimator 314 may further rely on data from an external server 324 such as map data, geographical speed limit data, traffic data, and other data which may influence upcoming speed estimations. The speed control estimator 314 may output a signal 322 indicative of a desired acceleration $a_{x\_Spd}$ (which may range across both positive and negative values) based on the forecasted upcoming vehicle speed.

In some examples the speed control estimator operates by balancing speed error values against the target speed and the required acceleration. Accurate speed control may need to account for aggressive acceleration and deceleration values, along with frequent changes of these values. Such rapid changes may degrade fuel efficiency. An optimization equation (2) below may be employed to find the optimal balance between the speed control error and the acceleration request.

$$J=\Sigma[Q(k)(V_{x_{desired}}(k)-V_{x_{meas}}(k))^2+R(k)a_{x\_Spd}(k)^2] \quad (2)$$

In equation (2) above k is a discrete time parameter, and Q(k) and R(k) are control tuning parameters which may vary as a function of k. $V_{x_{meas}}$ is a speed sensor measurement of the host vehicle, as may be received from the vehicle sensor suite. $a_{x\_Spd}(k)$ is an acceleration required to maintain a cruise set speed. The required acceleration $a_{x\_Spd}(k)$ to achieve the target speed, $V_{x_{desired}}(k)$, may be calculated by equation (3) below.

$$a_{x\_Spd}=-K_{spd}(V_{x_{meas}},k)+K_{aux}(V_{x_{desired}},k) \quad (3)$$

In equation (3) above, $K_{spd}$ is a function of Q(k), R(k), $V_{x_{meas}}$, and sample time k. And, $K_{aux}$ is a function of Q(k), R(k), $V_{x_{desired}}$, and sample time k.

A third control scheme may also include a downhill estimator model 326 to account for road grade conditions to predict upcoming vehicle acceleration. Input from an external server 324 (e.g., a map database) may include a signal 328 indicative of road grade information derived from external sources. The downhill estimator 326 may also rely on data measured at the vehicle from the sensor suite 308, such as a signal 330 indicative of road grade at the host vehicle location. The downhill estimator 326 may output a signal 332 indicative of a forecasted acceleration effect $a_{x\_road}$ due to road grade conditions.

In some examples, road grade of upcoming route segments can be estimated using map data and GPS position measurements. From the estimated road grade, it can be determined how much free acceleration will be obtained (e.g., travelling along downward grade), or how much supplemental acceleration is required to maintain velocity (e.g., travelling along upward grade). Equation (4) below may be used to estimate road grade effects.

$$a_{x\_road}=g*\sin(h) \quad (4)$$

In equation (4) above, g represents gravity, and h is a road grade angle calculated based on information from the map database. Discussed in more detail below, this predicted acceleration $a_{x\_road}$ is combined with the desired acceleration values calculated in the speed controller (i.e., $a_{x\_Spd}$) and the headway controller (i.e., $a_{x\_hdw}$) for a final composite acceleration request.

With continued reference to FIG. 3, an "Ecomode" enabling portion 334 of the algorithm 300 is provided to determine opportunistic timing to engage in aggressive fuel conservation operations without affecting vehicle performance. The Ecomode portion 334 may issue a signal 336 indicative of a decision to enter or exit the Ecomode. The Ecomode portion may also output a signal 338 indicative of required torque at a location along the driveline account for the acceleration requests of each of the plurality of control schemes that contribute to determining propulsion system output. According to some examples the torque required at the axle, $T_{axle\_req}$ is determined by equation (5) below based on the plurality of sources of route preview information.

$$T_{axle\_req} = mR(a_{x\_hdw} + a_{x\_Spd} + a_{x\_road}) + T_{road\_load} \quad (5)$$

According to equation (5) above, m represents vehicle mass, and R represents road wheel radius. $T_{road\_load}$ represents road load, and is a known value. Road load is the load presented to the propulsion system required to maintain the current vehicle speed. The forces comprehended within $T_{road\_load}$ include such aspects as aero resistance, rolling resistance, viscous losses, road grade, wind, or other loads presented by road or external conditions. The required axle torque $T_{axle\_req}$ may be predicted for an upcoming duration of time according to the range of the sensors (e.g., if 150 meters is the radar detection range and vehicle speed is 30 m/s, the prediction time may be around 5 seconds). If the prediction of $T_{axle\_req}$ is within a predetermined torque range, the Ecomode portion 334 outputs signal 336 to include a request to enter Ecomode. According to some examples discussed in more detail below, hysteresis controls are applied to the algorithm to provide smooth transitions during Ecomode entering and exiting conditions.

Each of the signals 336 and 338 are transmitted to one or more control modules 340 to influence operation of the propulsion system. With specific reference to FIG. 3, outputs from Ecomode portion 334 balance operation of each of an engine control module (ECM), motor control panel (MCP), and a hybrid vehicle operating system (HOS). In cases where the required torque $T_{axle\_req}$ exceeds a negative torque threshold, the Ecomode portion 334 outputs a signal 342 indicative of a deceleration request. The signal 342 may be transmitted to one or more control modules 344 to aggressively decelerate the vehicle. With specific reference to FIG. 3, an electronic brake control module (EBCM) 344 may receive a deceleration request signal when the magnitude of deceleration is greater than a threshold. In situations when milder deceleration is requested, the algorithm 300 may employ engine braking or electric motor regenerative braking to cause the deceleration.

Figure 4:
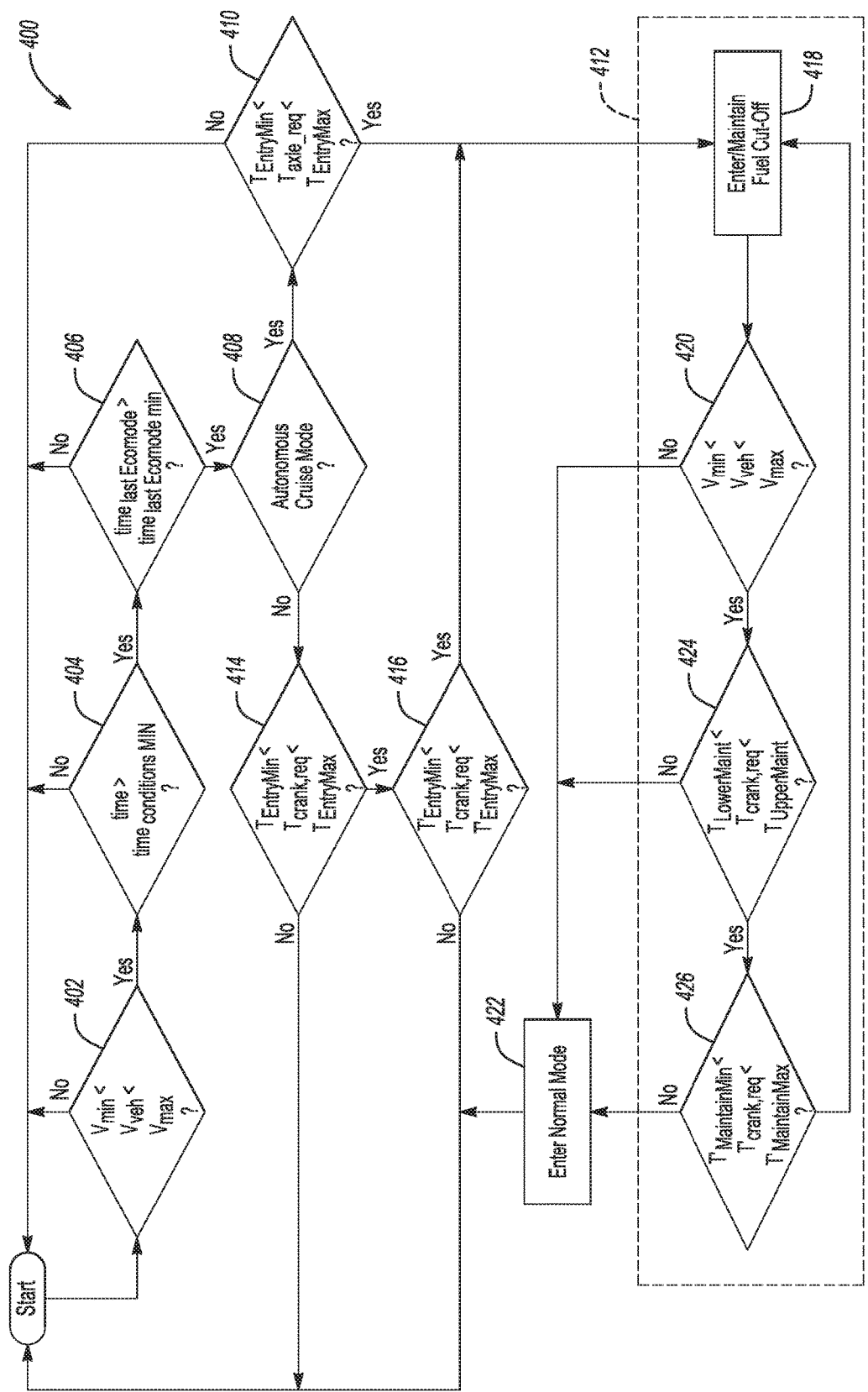
FIG. 4 is a flowchart of a propulsion system control algorithm.

FIG. 4 depicts a flowchart representing an algorithm 400 for engaging Ecomode propulsion system control. At step 402 the algorithm includes assessing whether the velocity of the host vehicle $V_{veh}$ is within a predetermined threshold range (i.e., greater than a first velocity threshold $V_{min}$ and less than a second velocity threshold $V_{max}$). If the vehicle velocity $V_{veh}$ is outside of the predetermined threshold at step 402 the algorithm includes returning to the start and continuing to monitor for opportunistic speed range to enter Ecomode propulsion system control.

If at step 402 the vehicle velocity $V_{veh}$ is within the predetermined range, the algorithm includes assessing the time duration that the vehicle velocity is within the predetermined velocity range. One or more timers may be triggered to track the time duration once the velocity entered the predetermined velocity range. If at step 404 the elapsed time duration is less than a time threshold, $time_{conditions\ MIN}$, the algorithm includes returning to the start and continuing to monitor for opportunistic speed range to enter Ecomode propulsion system control. The minimum time duration may operate as a hysteresis portion to ensure velocity is at a steady state for sufficient time prior to entering Ecomode propulsion system control.

If at step 404 the elapsed time duration is greater than the time threshold, $time_{conditions\ MIN}$, the algorithm includes assessing the time since the last departure from Ecomode propulsion system control. Similar to as discussed above, one or more timers may be triggered to track the time duration since departure from the previous Ecomode propulsion system control mode. If at step 406 the time since the last Ecomode, $time_{last\ Ecomode}$, is less than a minimum time threshold $time_{last\ Ecomode,\ min}$, the algorithm includes returning to the start and continuing to monitor for opportunistic speed range to enter Ecomode propulsion system control. Step 404 and step 406 collectively may operate as hysteresis portions of the algorithm 400 to prevent excessive on and off switching of the Ecomode propulsion system control mode.

If at step 406 the elapsed time duration since the last Ecomode, $time_{last\ Ecomode}$, is greater than the minimum time threshold $time_{last\ Ecomode,\ min}$, the algorithm includes determining at step 408 whether the vehicle is in an autonomous cruise control mode. If the vehicle is already in an autonomous cruise control mode at step 408 the algorithm includes assessing at step 410 whether the predicted axle torque $T_{axle\_req}$, is within a predetermined range (i.e., greater than a first torque threshold $T_{EntryMin}$, and less than a second torque threshold $T_{EntryMax}$). In the autonomous driving mode $T_{axle\_req}$ may be determined largely or solely by a vehicle controller with little or no driver input. If $T_{axle\_req}$, is within the predetermined range at step 410 the algorithm includes entering the Ecomode section 412. While the description of the autonomous cruise control mode provided here uses the predicted axle torque $T_{axle\_req}$, a similar approach could be applied in the engine torque domain.

If at step 408 the vehicle is in a normal manual driving mode the algorithm includes assessing at step 414 the demanded torque at the engine crankshaft $T_{crank,req}$. Specifically, the algorithm includes assessing whether $T_{crank,req}$ is within a predetermined range (i.e., greater than a first torque threshold $T_{EntryMin}$, and less than a second torque threshold $T_{EntryMax}$). It should be appreciated that the predetermined range used to assess crankshaft torque may be distinct from range used to assess axle torque discussed above. While the description of the driver request provided here is in the crankshaft torque domain, a similar approach could be applied in the axle torque domain. If $T_{crank,req}$ is within the predetermined range, the algorithm includes assessing the rate of change of the demanded torque $T'_{crank,req}$. In this way, certain abrupt changes in torque demand from a driver may not cause the control algorithm to enter Ecomode when they might cause rapid mode switching. If at step 416 $T'_{crank,req}$ is within a predetermined rate of change threshold (i.e., greater than a first rate of change threshold $T'_{EntryMin}$, and less than a second rate of change threshold $T'_{EntryMax}$) the algorithm includes entering the Ecomode section 412. In practice, monitoring the rate of change of the demanded crankshaft torque operates as an additional hysteresis portion to prevent excessive rapid mode switching into and out of Ecomode.

At step 418 the algorithm includes engaging one or more fuel efficiency improvement efforts based on the demanded torque while driving. The algorithm includes selection of the most aggressive fuel conservation action possible without detracting from performance of the propulsion system. Any combination of deceleration fuel cut off (DFCO), engine idle, regenerative braking, transmission shift schedule modification, engine cylinder deactivation, or other fuel efficiency management actions are employed to take advantage of the known upcoming torque conditions. Since the torque demands are within specific criteria, more aggressive fuel conservation adjustments may be undertaken without affecting passenger perception of vehicle performance.

The controller may be programmed to monitor each of vehicle velocity, crankshaft torque, and rate of change of the crankshaft torque to determine whether to stay in Ecomode. Algorithm 400 includes continuing to monitor torque output and vehicle velocity to determine whether to maintain the fuel conservation adjustments. At step 420 the algorithm includes assessing whether the velocity of the host vehicle $V_{veh}$ is within a predetermined threshold range (i.e., greater than a first velocity threshold $V_{min}$ and less than a second velocity threshold $V_{max}$). It should be appreciated that the velocity ranged used to determine whether to maintain Ecomode may be distinct from the velocity range used to determine whether to enter Ecomode. If $V_{veh}$ is outside of the predetermined threshold range, the algorithm includes exiting Ecomode and entering normal operation mode at step 422.

If $V_{veh}$ is within the predetermined range at step 420, the algorithm includes assessing at step 424 whether $T_{crank,req}$ remains within a predetermined maintenance range to hold Ecomode (i.e., greater than a first torque threshold $T_{LowerMaint}$, and less than a second torque threshold $T_{UpperMaint}$). If $T_{crank,req}$ leaves the predetermined range, the algorithm includes exiting Ecomode and entering normal operation mode at step 422.

Similarly, if $T_{crank,req}$ is within the predetermined range at step 424, the algorithm includes assessing the rate of change of the demanded torque $T'_{crank,req}$. If at step 426 $T'_{crank,req}$ is outside of a predetermined maintenance range (i.e., greater than a first rate of change threshold $T'_{Maint\ Min}$, and less than a second rate of change threshold $T'_{Maint\ Max}$) the algorithm includes exiting Ecomode and entering normal operation mode at step 422. Similar to above examples, ranges used to determine whether to maintain Ecomode may differ from those used to determine whether to enter Ecomode. If $T'_{crank,req}$ is within the predetermined rang at step 426, the algorithm includes returning to step 418 and maintaining fuel conservation actions and subsequently polling the engine operation to determine whether to maintain Ecomode.

Figure 5:
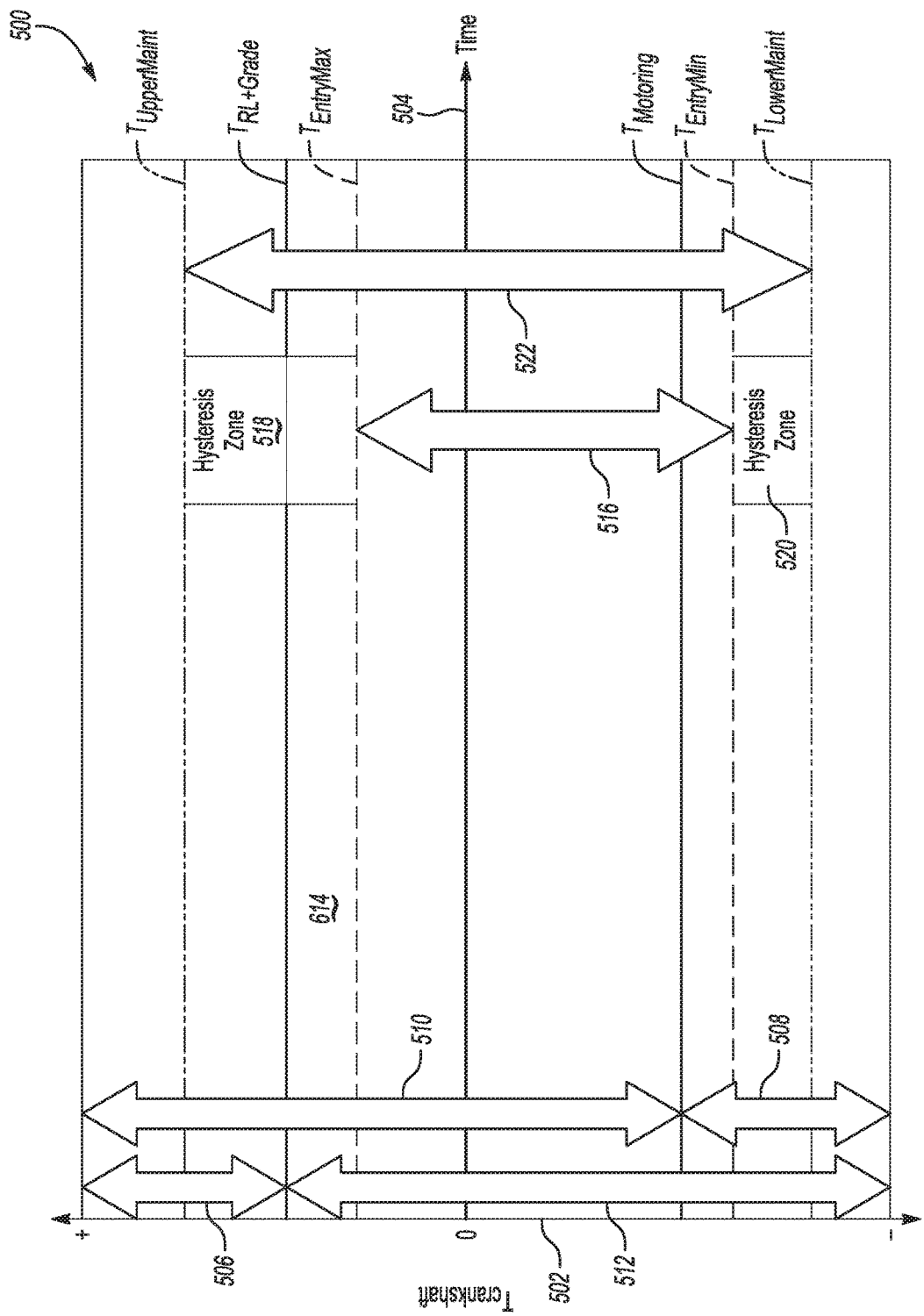
FIG. 5 is a plot of propulsion system torque mode selection threshold ranges.

Referring to FIG. 5, plot 500 depicts an example operating logic of the selection of Ecomode sailing for the propulsion system. Vertical axis 502 represents torque demanded at the engine crankshaft. Horizontal axis 504 represents time, where torque required at the crankshaft may vary over time depending on vehicle operating conditions. Several different preferred operating bands may exist where it is suitable to engage Ecomode operation while still satisfying driver torque demands.

At very high torque demand ranges, engine output may be such that the Ecomode is not preferred. For example, during a desired acceleration period, positive crankshaft torque values exceed the road load torque plus the toque resistance due to road grade (i.e., $T_{crankshaft}>T_{RL+Grade}$). Torque range 516 of plot 500 graphically represents an acceleration torque range within which there may be little or no opportunity for Ecomode operation. Additionally, the torque value corresponding to $T_{RL+Grade}$ may be the crankshaft torque required to maintain steady vehicle speed.

Similarly, at significant negative torque demand ranges, the vehicle deceleration rate required may exceed the combined negative torque capabilities of engine braking and regenerative braking. Specifically, for negative crankshaft torque values that exceed the motoring torque threshold $T_{Motoring}$ (i.e., $T_{crankshaft}<T_{Motoring}$), the vehicle deceleration rate may be largely dictated by the vehicle's foundation brakes. Torque range 508 represents negative torque ranges where the foundation brakes are required to slow the vehicle.

In torque range 508 the driver may stop applying the accelerator pedal and actively apply the brake pedal to decelerate the vehicle. Under aggressive deceleration conditions, the Ecomode cruise strategy may additionally apply aggressive fuel cutoff strategies to deactivate the engine along with regenerative braking and friction braking.

In moderate acceleration and deceleration conditions, Ecomode may be configured to take advantage of opportunities to modify operation of the propulsion system to improve fuel efficiency. For required torque values greater than $T_{Motoring}$ the driver is likely to apply the accelerator pedal to some degree, whether to increase or maintain speed or to limit deceleration. Torque range 510 represents a possible torque range where the accelerator pedal is applied which creates a fuel delivery demand for the engine. Vehicle acceleration torque range 506, as described above, may be a subset of the accelerator pedal application range. For required torque values less than $T_{RL+Grade}$ the torque output is less than that required to maintain steady state speed—thus the vehicle decelerates under these conditions. Torque range 512 represents a possible torque range where the vehicle undergoes and overall deceleration. An overlapping portion of torque range 510 and torque range 512 represents a moderate torque opportunity range to implement Ecomode cruising and modify engine operation.

For positive crankshaft torque values less than $T_{RL+Grade}$ (i.e., $0\ \text{Nm}<T_{crankshaft}<T_{RL+Grade}$), the vehicle will undergo slight deceleration even though the driver is causing some degree of positive torque by depressing the accelerator pedal. And, for negative crankshaft torque values that do not exceed the motoring torque threshold $T_{Motoring}$ (i.e., $0\ \text{Nm}>T_{crankshaft}>T_{Motoring}$), the vehicle may undergo moderate deceleration. In this case, the engine may remain active and vehicle deceleration may be largely governed by engine losses. And, engine friction may be one of the main forces relied upon to decelerate the vehicle. For example, the driver (or autonomous steering logic) may determine a need to decelerate and reduce the engine throttle to allow the vehicle to coast without applying the foundation brakes. Cylinder deactivation and other fuel conservation actions may also be applied in this region. Generally, opportunities to exploit Ecomode largely occur during conditions when $T_{crankshaft}$ is between a positive steady state torque value $T_{RL+Grade}$ and a negative torque value $T_{Motoring}$.

As mentioned above, the Ecomode selection algorithms may include portions which manage mode switching to avoid undesirable rapid on-off cycles of the engine from start-stop functions. At least one buffer band is applied to crankshaft torque thresholds to provide a hysteresis effect for either entering and/or exiting the cruise mode. For example, a scalar value may be applied to $T_{RL+Grade}$ to establish an upper limit $T_{EntryMax}$ for entry in to Ecomode. More specifically, $T_{EntryMax}$ may be defined by equation (6) below.

$$T_{EntryMax}=T_{RL+Grade}*k_1 \qquad (6)$$

$k_1$ represents a scalar multiplier to create an effective buffer zone 514 relative to the torque $T_{RL+Grade}$ corresponding to steady state speed. Thus the buffer zone 514 is dynamic and varies according to driving conditions. The buffer zone 514 also prevents unnecessarily frequent entry into Ecomode for cases where a driver attempts to target steady state speed and causes a moderate degree of torque variation about $T_{RL+Grade}$. In some examples, $k_1$ is a predetermined value between 0 and 1 such that $T_{EntryMax}$ is a controlled amount less than the steady state cruising torque, $T_{RL+Grade}$. The requested torque at the crankshaft must reduce to be below the buffer zone 514 to engage the Ecomode. Similarly, a lower entry threshold $T_{EntryMin}$ may be derived based on negative torque value $T_{Motoring}$ beneath which DFCO and other active braking operations are applied. According to some examples, $T_{EntryMin}$ is defined by equation (7) below. A predetermined scalar value $k_2$ greater than 1 may be applied such the lower entry threshold $T_{EntryMin}$ requires negative torque which exceeds negative torque value $T_{Motoring}$.

$$T_{EntryMin} = T_{Motoring} * k_2 \qquad (7)$$

Depicted in an alternative way, torque range 516 represents an example torque band within which Ecomode is engaged (i.e., $T_{crank,req}$ greater than the first torque threshold $T_{EntryMin}$, and less than the second torque threshold $T_{EntryMax}$).

Once Ecomode is engaged, a different torque range may be applied as a criteria to maintain the Ecomode. For example a distinct predetermined scalar value $k_3$ may be applied to the steady state cruising torque $T_{RL+Grade}$ to establish an upper limit torque threshold $T_{UpperMaint}$ to maintain the Ecomode. A difference between the upper threshold to enter Ecomode and an upper threshold to maintain Ecomode (i.e., $T_{UpperMaint} - T_{EntryMax}$) serves as an upper hysteresis zone 518 to prevent excessive mode switching once Ecomode is engaged and torque varies near the upper thresholds.

$$T_{UpperMaint} = T_{RL+Grade} * k_3 \qquad (8)$$

Likewise, near the lower torque thresholds a distinct predetermined scalar value $k_4$ may be applied to the negative torque value $T_{Motoring}$ to establish a lower limit torque threshold $T_{LowerMaint}$ to maintain the Ecomode. A difference between the lower threshold to enter Ecomode and the lower threshold to maintain Ecomode (i.e., $T_{EntryMin} - T_{Lower\ Maint}$) serves as a lower hysteresis zone 520 to prevent excessive mode switching once Ecomode is engaged and torque varies near the lower thresholds.

Depicted in an alternative way, torque range 522 represents an example torque band within which Ecomode is maintained once engaged (i.e., $T_{crank,req}$ greater than the first torque threshold $T_{LowerMaint}$ and less than the second torque threshold $T_{UpperMaint}$).

Figure 6:
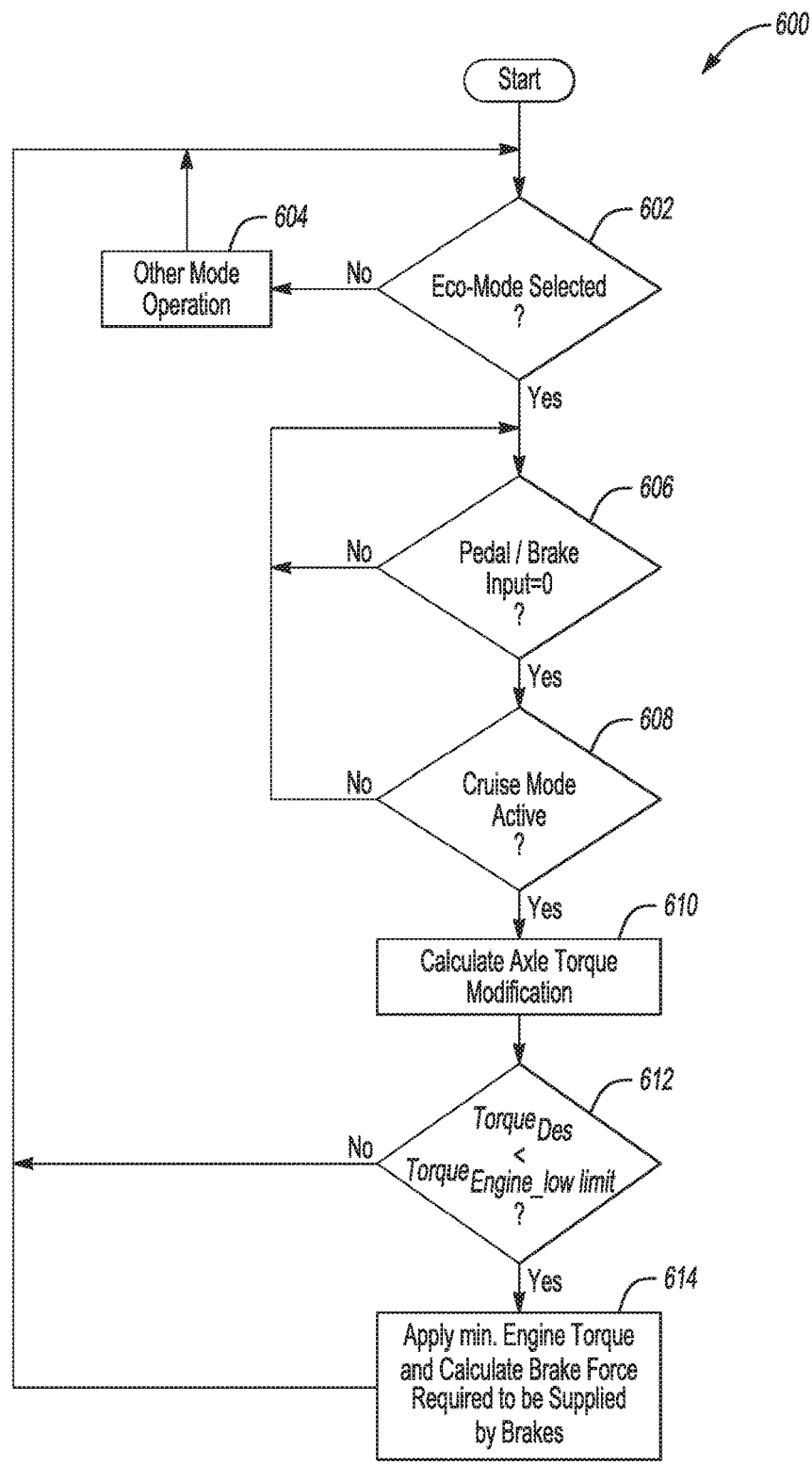
FIG. 6 is a flowchart of an alternate propulsion system control algorithm.

Referring to FIG. 6, a flowchart depicts an optimized cruise control mode according to algorithm 600. When engaged, specific axle torque modifications may be implemented using route look-ahead information. At step 602 the algorithm includes determining what propulsion mode is selected. According to some examples, any of a number of different propulsion modes may be selected including normal mode, sport mode, and Ecomode as discussed above. If at step 602 Ecomode is not selected, the algorithm may operate under other operating modes at step 604 and not engage an axle torque modification according to an Ecomode operation strategy.

If at step 602 Ecomode is selected, the algorithm includes determining whether a driver input is provided which would affect propulsion system longitudinal control. More specifically, if at step 606 there is no driver input (i.e., driver accelerator pedal and/or brake pedal input equals zero), the algorithm includes assessing at step 608 whether a cruise control mode is active. If either driver input is present at 606 or cruise control inactive at step 608, the algorithm includes returning to poll for poll for driver input or cruise control activation as long as Ecomode is activated.

$$AxleTorque_{des} = AxleTorque_{Cal} \pm K * AxleTorque_{Preview} \qquad (9)$$

$AxleTorque_{Preview}$ represents the required torque based on a look-ahead window of upcoming road conditions. The value of the constant K is zero if the calculated torque modification is outside of a threshold range. Otherwise, the value of the constant K is greater than zero, based on a torque reserve safety limit multiplier, and the constant is optimized according to the particular mode which is in effect at the time of the calculation. According to some examples, $AxleTorque_{Preview}$ is defined by equation (10).

$$AxleTorque_{Preview} = \tau_{instantaneous} - ((F_{Velocity} + F_{Aero} + F_{Grade}) * r_{Shaft}) \qquad (10)$$

The forces of the look-ahead window that contribute to the upcoming required torque are based on fusion of data from the various inputs from the vehicle sensor suite. $F_{Velocity}$ corresponds to the force required to maintain a target velocity. $F_{Aero}$ corresponds to the forces related to aerodynamic resistance. $F_{Grade}$ corresponds to the forces related to road grade conditions along the upcoming route. $r_{Shaft}$ represents a radius of the driveshaft.

$$F_{Velocity} = m_{vehicle} * \frac{(v_{anticipated} - v_{current})}{\Delta t_{window}} \qquad (11)$$

In equation (11) above, $m_{vehicle}$ represents vehicle mass, $v_{current}$ represents instantaneous vehicle velocity, and $v_{anticipated}$ represents forecasted velocity based on a number of inputs including at least route speed limit information and driver acceleration inputs. $\Delta t_{window}$ represents the window of upcoming time for which velocity is anticipated. One or more controllers is programmed to rely on a plurality of data sources to calculate $v_{anticipated}$. Data from the onboard sensor suite (e.g., radars, lidars, cameras), off-board infrastructure devices (e.g., signalized traffic lights, traffic flow monitoring systems), as well as other vehicles (V2V signals) are aggregated to provide a prediction of upcoming vehicle speed.

According to some examples, $F_{Aero}$ is represented by equation (12).

$$F_{Aero} = k_{aero} * v_{anticipated}^2 \qquad (12)$$

In equation (12) above, $k_{aero}$ represents an aerodynamic coefficient based on vehicle shape. $F_{Grade}$ may be represented by equation (13) below.

$$F_{Grade} = m_{vehicle} * g * \sin(\theta_{anticipated\_grade} - \theta_{current\_grade}) \qquad (13)$$

In equation (13) above, g represents gravity, $\theta_{current\_grade}$ represents the present road grade angle, and $\theta_{anticipated\_grade}$ represents the upcoming road grade angle along the upcoming route.

Referring back to FIG. 6, once the axle torque modification is calculated at step 610, the algorithm includes assessing the value of the desired torque. If at step 612 the desired axle torque $Torque_{Des}$ is greater than a predetermined torque threshold $Torque_{Engine\ Low\ Limit}$, the algorithm includes applying the modified axle torque without braking force beyond the engine braking capabilities. If at step 612 $Torque_{Des}$ is less than $Torque_{Engine\ Low\ Limit}$, the algorithm includes calculating the total required braking force which is beyond the engine braking limits. At step 614 the algorithm includes applying the full capabilities of engine braking torque, and calculating the supplemental braking force required by the friction brakes to satisfy the modified axle torque $AxleTorque_{des}$.

An engine calibration table may be stored in a memory at the controller to vary engine operation according to driving conditions. The controller may be programmed to look up appropriate parameters to vary air-fuel ratio, fuel injector pulse width and timing, spark plug fire duration and timing, or other operating parameters. Like the above examples, the controller may be programmed to adjust the relevant lookup value based on the forecasted look ahead information. For example the table lookup may use an x-axis as a lookup independent variable upon which to base a given operating parameter. The value used for the independent variable lookup is then modified based on the look ahead window to change hysteresis limits. Equation (14) below represents one such engine calibration lookup that is adjusted based on forecasted operating conditions.

$$\text{Lookup}_{x\text{-}axis,modified} = \text{Lookup}_{x\text{-}axis,current} \pm \text{hysteresis}_{lookahead\_window} \quad (14)$$

The hysteresis modifier $\text{hysteresis}_{lookahead\_window}$ may also be applied to a plurality of different engine calibration tables to affect the implementation of DFCO, combustion cylinder firing fraction, engine start-stop timing, and other fuel conservation features of the engine.

According to further examples, the lookahead information may be applied transmission gear ratio management. Generally, the transmission gear ratio is dependent on throttle effective pedal position (EPP). The forecasted driving conditions may be considered by modifying the EPP using the preview information as indicated by equation (15) below. The EPP correction $\text{EPP Correction}_{lookahead\ window}$ based on the look ahead information can be calculated realtime using a model relying on one or more operating conditions as inputs. Alternatively $\text{EPP Correction}_{lookahead\ window}$ may be calculated in advance, stored, and recalled from a lookup table when engine operation modifications are required.

$$\text{EPP}_{modified} = \text{EPP}_{calculated} \pm \text{EPP Correction}_{lookahead\ window} \quad (15)$$

According to still further examples, the controller may be programmed to determine optimal engine torque after an upcoming stop is predicted, then apply a predetermined longitudinal velocity profile to influence vehicle deceleration. The controller may also be programmed to determine an optimal engine coast down approaching a known upcoming stop. The controller may be further programmed to adapt any of various velocity profiles based on known vehicle weight and sensed road grade information. During a conventional approach to a vehicle stop, all of the kinetic energy of the vehicle could be wasted via the friction brake system, which not only results in suboptimal fuel efficiency of the vehicle but also contributes to added wear of the brake system. Look ahead information received based on data from vehicle connectivity and the onboard sensor suite is used to minimize lost energy by forecasting a stopping event as early as possible, then coordinating vehicle and powertrain control systems to reduce energy consumption. Forecasting the stopping event as early as possible minimizes the fuel consumption by allowing the vehicle to run at most efficient powertrain operating modes and maximize the recovery of potential energy through coasting. Once a stopping event is forecasted, the propulsion system controller converges towards an optimal vehicle speed profile to minimize energy consumption. Specifically, the approach toward a stop can be broken down into two segments of operation. During the first segment of operation, positive torque might still be required from the powertrain since the vehicle is too far away to coast to the stopping location. In this segment, the control strategy may include operating the vehicle near the most fuel-efficient operating condition considering the permissible speed limit regulations (upper and lower) as well as traffic flow. This also includes optimizing cylinder deactivation functions for the combustion engine.

At the same time, the controller executes a model-based controller algorithm to continue forecasting the propulsion system torque demand from the current vehicle position leading up to the stopping location. Once positive engine torque is no longer required (i.e., the vehicle has enough kinetic energy to coast to stop at the stopping location), the fuel supply may be shut off (i.e., aggressive DFCO) and the vehicle is allowed to coast towards the stop during the second segment of operation. Under many existing DFCO strategies without forecast information, the engine is refueled after vehicle and/or engine speed drops below a calibrated threshold. Using the lookahead information according to the present disclosure, refueling can be bypassed altogether, thus using substantially no fuel at all during the entire stopping process.

Additional fuel-saving features may also be employed during eco-approach. For example, to maximize the utilization of vehicle kinetic energy, the transmission can be placed into neutral to remove the "engine braking" effect during coasting. Removal of the engine braking effect allows for longer coasting distances, thus maximizing fuel savings when stop is sufficiently forecasted. Also discussed above, portions of the control algorithm take into consideration the lookahead road grade since the ability to coast may be heavily influenced by the road grade. The torque forecasting algorithm includes a portion to determine the optimal timing to implement Ecomode coasting. It should be appreciated that under certain conditions, it may be desirable to maintain engine braking to minimize mechanical braking (e.g., when a traffic stopping event is forecasted too late for an extended coast).

The controller may be programmed to select an optimal deceleration profile to approach the stop condition based on the particular fuel consumption mode in effect. The particular profile chosen influences the distance from an upcoming stop at which the algorithm engages an Ecomode coasting approach. The deceleration profile may include a predetermination of at least one of an ideal velocity profile and an ideal engine torque profile.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The above description of variants is only illustrative of components, elements, acts, product and methods considered to be within the scope of the invention. The words used in the specification are words of description rather than limitation, and it is understood that various changes can be made without departing from the spirit and scope of the disclosure. As previously described, the features of various embodiments can be combined and rearranged to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle propulsion system comprising:
   a combustion engine configured to output a propulsion torque to satisfy a propulsion demand;
   a traction electric machine to generate a supplemental torque to selectively supplement the propulsion torque; and
   a controller programmed to
      forecast an acceleration demand based on at least one model,
      issue a command indicative of a required axle torque corresponding to the acceleration demand, and
      engage at least one fuel conservation action in response to the required axle torque being within a first predetermined torque threshold range.

2. The vehicle propulsion system of claim 1 wherein the controller is further programmed to modify the forecasted acceleration demand based on route information.

3. The vehicle propulsion system of claim 1 wherein the at least one model includes at least one of the following: a downhill estimator model, a speed control estimator model, and a headway control model.

4. The vehicle propulsion system of claim 1 wherein the controller is further programmed to engage the at least one fuel conservation action in response to a rate of change of the required axle torque being within a predetermined rate of change threshold range.

5. The vehicle propulsion system of claim 1 wherein the fuel conservation action includes at least one of: regenerative braking of the electric machine, a deceleration fuel cutoff of the combustion engine, a cylinder deactivation of the combustion engine, a transmission shift schedule modification, and a deceleration fuel cutoff of a driveline during coasting.

6. The vehicle propulsion system of claim 1 wherein the controller is further programmed to maintain the fuel conservation action while the required axle torque is within a second predetermined torque threshold range that is wider than the first predetermined torque threshold range.

7. The vehicle propulsion system of claim 1 wherein the controller is further programmed to engage the at least one fuel conservation action in response to a vehicle velocity being within a predetermined velocity threshold range for a duration of time greater than a time threshold.

8. A method of controlling a vehicle propulsion system having a combustion engine configured to output a propulsion torque and a traction electric machine to generate a supplemental torque to selectively supplement the propulsion torque, the method comprising:
   forecasting an acceleration demand based on at least one model,
   issuing a command indicative of a required axle torque corresponding to the acceleration demand, and
   engaging at least one fuel conservation action in response to the required axle torque being within a first predetermined torque threshold range.

9. The method of claim 8 further comprising modifying the acceleration demand based on route information.

10. The method of claim 8 wherein the at least one model includes at least one of the following: a downhill estimator model, a speed control estimator model, and a headway control model.

11. The method of claim 8 wherein the fuel conservation action includes at least one of: regenerative braking of the electric machine, a deceleration fuel cutoff of the combustion engine, a cylinder deactivation of the combustion engine, modifying a transmission shift schedule, and a deceleration fuel cutoff of a driveline during coasting.

12. The method of claim 8 further comprising maintaining the fuel conservation action while the required axle torque is within a second predetermined torque threshold range that is wider than the first predetermined torque threshold range.

13. The method of claim 8 further comprising engaging the at least one fuel conservation action in response to a vehicle velocity being within a predetermined velocity threshold range for a duration of time exceeding a time threshold.

14. The method of claim 8 further comprising engaging the at least one fuel conservation action in response to a rate of change of the required axle torque being within a predetermined rate of change threshold range.

15. A vehicle propulsion system comprising:
   a combustion engine configured to output a propulsion torque to satisfy a propulsion demand;
   a traction electric machine to generate a supplemental torque to selectively supplement the propulsion torque; and
   a controller programmed to
      forecast an acceleration demand based on route information,
      issue a command indicative of a required axle torque corresponding to the acceleration demand, and
      engage at least one fuel conservation action in response to the required axle torque being within a first predetermined torque threshold range.

16. The vehicle propulsion system of claim 15 wherein the fuel conservation action includes at least one of the following: regenerative braking of the electric machine, a deceleration fuel cutoff of the combustion engine, a cylinder deactivation of the combustion engine, modifying a transmission shift schedule, and a deceleration fuel cutoff of a driveline during coasting.

17. The vehicle propulsion system of claim 15 wherein forecasting an acceleration demand is further based on at least one of: a downhill estimator model, a speed control estimator model, and a headway control model.

18. The vehicle propulsion system of claim 15 wherein an upper limit of the first predetermined torque threshold range is based on a crankshaft torque corresponding to a steady state vehicle speed, and a lower limit of the first predetermined torque threshold range is based on a negative torque limit of combustion engine braking and regenerative braking.

19. The vehicle propulsion system of claim 15 wherein the controller is further programmed to maintain the fuel conservation action while the required axle torque is within a second predetermined torque threshold range that is wider than the first predetermined torque threshold range, wherein the controller is further programmed to engage the at least one fuel conservation action in response to a vehicle velocity being within a predetermined velocity threshold range for a duration of time greater than a time threshold.

20. The vehicle propulsion system of claim 15, further comprising:
- a first energy storage device and a second energy storage device; and
- a control system configured to select one of the first and second engine storage devices to provide electric power to maintain safety critical loads in at least one of an engine-off condition and a fault condition.

* * * * *